No. 810,454. PATENTED JAN. 23, 1906.
C. E. ACKER.
PROCESS OF MAKING STANNIC CHLORID.
APPLICATION FILED JUNE 8, 1903. RENEWED JUNE 14, 1905.
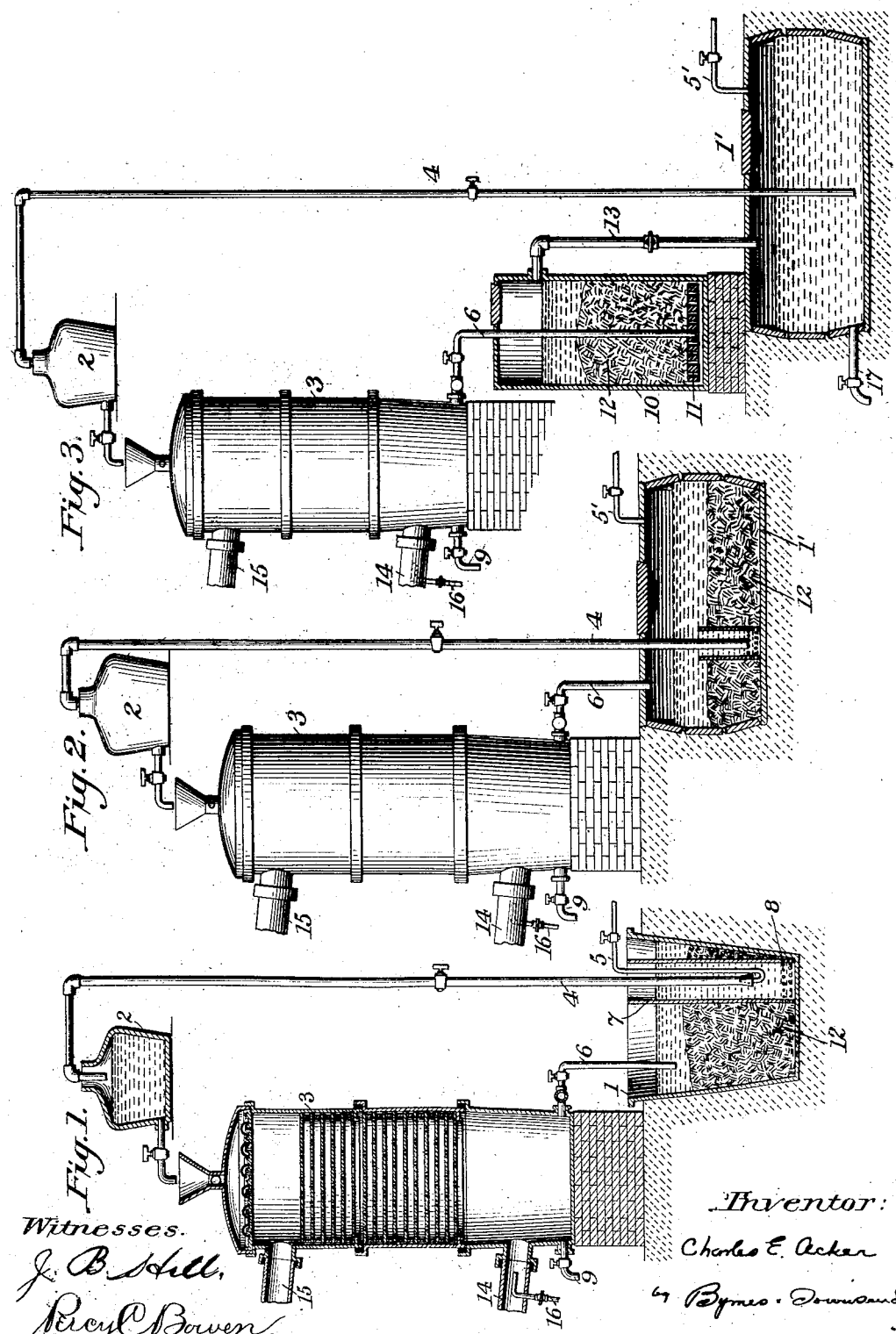

UNITED STATES PATENT OFFICE.

CHARLES E. ACKER, OF NIAGARA FALLS, NEW YORK, ASSIGNOR TO ACKER PROCESS COMPANY, A CORPORATION OF NEW JERSEY.

PROCESS OF MAKING STANNIC CHLORID.

No. 810,454.  Specification of Letters Patent.  Patented Jan. 23, 1906.

Application filed June 8, 1903. Renewed June 14, 1905. Serial No. 265,237.

*To all whom it may concern:*

Be it known that I, CHARLES E. ACKER, a citizen of the United States, residing at Niagara Falls, in the county of Niagara and State of New York, have invented certain new and useful Improvements in Methods of Making Stannic Chlorid, of which the following is a specification.

This invention is a method of making stannic chlorid, whereby it is possible to obtain solutions of a concentration heretofore unknown as a commercial product and of a high degree of purity. Heretofore it has been customary to prepare solutions of this sort by reacting upon metallic tin with hydrochloric acid in solution, thereby forming stannous chlorid, and subsequently converting said chlorid to stannic chlorid by addition of potassium chlorate to the acid solution. This process is relatively expensive, since the chlorin is derived from the comparatively costly compounds, hydrochloric acid and potassium chlorate, and is furthermore subject to the disadvantages that the solutions produced cannot, in practice exceed a density of 50° to 51° Baumé, and are contaminated by the presence of considerable quantities of potassium chlorid derived from the reduction of the chlorate. Furthermore, it is impractical to concentrate such solutions, by reason of the loss of stannic chlorid by volatilization and the tendency of the solutions to become basic. Solutions of a density of 60° Baumé have been prepared by first producing a solution of stannous chlorid, concentrating the same to saturation, and subsequently converting it by means of potassium chlorate to stannic chlorid; but this process is an expensive one, and the solutions obtained are also contaminated by potassium chlorid. I have now discovered a simple and effective method of producing stannic-chlorid solutions of extremely high concentration, the specific gravity of which may vary from 1.800 to 1.9600, which solutions are uncontaminated by impurities of any kind. According to my method chlorin is employed in a free or uncombined state, and the process admits, therefore, of a high degree of economy.

For a full understanding of my invention reference is made to the accompanying drawings, wherein—

Figure 1 shows in vertical section one form of apparatus which may be used for carrying out my process. Fig. 2 is a similar view showing a modified form thereof. Fig. 3 is a similar view of a further modification.

Referring to Fig. 1, 1 represents a vat or tank which may conveniently be of glazed earthenware. 2 is a storage-reservoir, and 3 a reaction-tower, shown as of the Rohrmann type, but which may be of any desired character. Means consisting of a conduit 4 and an air-injection pipe 5, leading into the lower portion thereof, are provided for continuously or intermittently conveying the solution in the tank 1 to the storage-reservoir 2. From said reservoir the liquid is permitted to flow downwardly through tower 3 and to return thence by conduit 6 to the vat 1. The vat 1 contains, in addition to the liquid to be hereinafter described, a mass of metallic tin, preferably in a suitably-divided condition, and to maintain a body of clear liquid in the region of the inlet to the conduit 4 said conduit is surrounded by a protective casing 7, which is conveniently provided with apertures 8 at the lower end for the admission of the liquid.

My process depends upon the fact that certain tin salts, in which the tin is in the tetravalent state, are extremely energetic solvents for metallic tin, the metal passing into solution and the tin in the solvent liquid being reduced in whole or in part to the divalent state. The liquid having thus lost a part or all of its solvent power for tin is thereupon brought into contact with chlorin gas under the conditions to be hereinafter described, whereby it is again raised wholly or in part to the tetravalent condition, with corresponding restoration of its solvent power. This regenerated solvent is again brought into contact with metallic tin and again regenerated, the operation proceeding in this manner until any required concentration is reached, whereupon the stannic-chlorid solution is withdrawn from the system, for instance, through the cock 9 and is utilized as desired, an equivalent amount of water or of water containing stannic or stannous chlorid or hydrochloric acid being added, and the process continued as before. If desired, the process may be made continuous by the gradual withdrawal of the stannic-chlorid solution and the addition of corresponding quantities of water or chlorid solutions. To obtain the solution containing the tin in the tetravalent condition, it may be withdrawn from the system at a point immediately following the treatment with chlorid. If the liquid contains an excess of chlorin, said excess is removed by the careful addition of stannous chlorid and a clear, pure, colorless, and dense solution is obtained.

Fig. 2 shows a modified form of device, in which the liquid after being subjected to the action of chlorin in the reaction-tower 3 is permitted to flow into one of a series of pressure-tanks 1', a number of such tanks being provided, and filled and discharged in succession, as will be readily understood. Said tanks 1' contain metallic tin, and after the solvent has been permitted to remain in contact therewith for a sufficient time the tank is closed and air-pressure applied above the surface of the liquid by means of a pipe 5', the liquid being thereby forced to the upper reservoir 2, from which it returns through the tower 3, as above described. It will be obvious that any suitable means for securing the circulation of the liquid may be substituted for those described.

In Fig. 3 I have shown a further modification, wherein an intermediate tank, tower, or vat 10 is provided to contain the metallic tin and permit the reaction therewith of the solvent liquid from the tower. In said tank 10 I have shown a distributing-plate 11 for the inflowing solution and a discharge-pipe 13 for the delivery of the same to the pressure-tank or other elevating device 1'.

These several devices for carrying out my method are shown by way of illustration only, and I desire it to be understood that my method is not limited to the employment of any particular apparatus.

I have shown at 14 15 an inlet and outlet, respectively, for the gas which serves to convert the tin from its divalent to its tetravalent condition and have referred to this gas as "chlorin." I have discovered, however, that it is neither necessary nor advisable to use pure chlorin gas for this purpose, but that the gas may contain a large proportion of air or oxygen. I have further discovered that the reaction is facilitated by the injection of steam into the chlorin, as by pipe 16, with the consequent formation of hydrochloric acid or by the use of chlorin containing a certain proportion of hydrochloric acid.

I have employed a gaseous mixture containing ninety-five to ninety-six per cent. of air, four to five per cent. chlorin, and a small percentage of hydrochloric acid. It will be understood that the reaction evolves a considerable amount of heat and that the temperature, if uncontrolled, would rise rapidly to a point at which hydrochloric acid and stannic chlorid would be volatilized, metastannates formed, and the solution injuriously affected. The use of dilute chlorin, as described, possesses the advantage that a portion of this heat is absorbed in raising the temperature of the large volume of gas so provided, and that therefore it is possible to utilize larger absolute quantities of chlorin in a given time—that is to say, one result of employing a dilute gas is to materially increase the output from a given apparatus. The addition of hydrochloric acid to the gas or to the solution or the utilization of gases containing hydrochloric acid results in the acceleration of the solvent action of stannic chlorid upon metallic tin and serves also to prevent the formation of oxychlorids of tin, the presence of which is in general undesirable.

It will be understood that the dilution of the chlorin need not be so great as above indicated by way of example and that proportionate effects are secured by the use of smaller proportions of the diluent.

It will be obvious that the character of the original liquid, which under the conditions of my process is to become a solution of stannic chlorid, may be considerably varied. Thus water may be employed or any desired proportion of stannic chlorid, stannous chlorid, hydrochloric acid, or stannous or stannic oxychlorid may be added thereto. In any case the result of the treatment by chlorin is to form a solvent for tin, and the result of the repeated utilization and regeneration of this solvent is to form solutions of stannic chlorid of a concentration heretofore unattainable in a commercial way.

The reaction proceeds with greatest facility at a temperature of 50° to 60° centigrade; but the process may be carried out at any temperature below the point at which stannic chlorid is volatilized.

I claim—

1. The method of making stannic chlorid, which consists in bringing metallic tin into contact with a solvent containing chlorin, thereby producing a solution containing stannous chlorid, and subjecting said solution to the action of a gaseous mixture containing free chlorin and a diluent, the diluent being in sufficient proportion to prevent undue rise of temperature, substantially as described.

2. The method of making stannic chlorid which consists in bringing metallic tin into contact with a solvent containing chlorin, thereby producing a solution containing stannous chlorid, and subjecting said solution to the action of a gaseous mixture containing free chlorin, hydrochloric acid and a diluent, the diluent being in sufficient proportion to prevent undue rise of temperature, substantially as described.

3. The method of making stannic chlorid which consists in bringing metallic tin into contact with a solvent containing chlorin, thereby producing a solution containing stannous chlorid, and subjecting said solution to the action of a gaseous mixture containing free chlorin, hydrochloric acid, and atmospheric air, the air being in sufficient proportion to prevent undue rise of temperature, substantially as described.

4. The method of making solutions containing stannic chlorid which consists in bringing metallic tin into contact with a solvent containing chlorin, thereby producing a solution of stannous chlorid, subjecting said solution to the action of free chlorin to convert it into stannic chlorid, bringing said stannic chlorid into contact with further quantities of tin, and again converting it into stannic chlorid, and repeating the operation until the desired concentration is reached, substantially as described.

5. The method of making highly-concentrated solutions containing stannic chlorid which consists in bringing metallic tin into contact with a solvent containing chlorin, thereby producing a solution of stannous chlorid, subjecting said solution to the action of free chlorin to convert it into stannic chlorid, bringing said stannic chlorid into contact with further quantities of tin, and again converting it into stannic chlorid, and repeating the operation until the concentration exceeds 1.800 specific gravity, substantially as described.

6. The method of making solutions containing stannic chlorid which consists in bringing metallic tin into contact with a solvent containing chlorin, thereby producing a solution of stannous chlorid, subjecting said solution to the action of a gaseous mixture containing free chlorin and hydrochloric acid to convert it into stannic chlorid, bringing said stannic chlorid into contact with further quantities of tin, and again converting it into stannic chlorid, and repeating the operation until the desired concentration is reached, substantially as described.

7. The method of making solutions containing stannic chlorid which consists in bringing metallic tin into contact with a solvent containing chlorin, thereby producing a solution of stannous chlorid, subjecting said solution to the action of a gaseous mixture containing free chlorin, hydrochloric acid and oxygen to convert it into stannic chlorid, bringing said stannic chlorid into contact with further quantities of tin, and again converting it into stannic chlorid, and repeating the operation until the desired concentration is reached, substantially as described.

8. The method of making solutions containing stannic chlorid which consists in bringing metallic tin into contact with a solvent containing chlorin, thereby producing a solution of stannous chlorid, subjecting said solution to the action of a gaseous mixture containing free chlorin, hydrochloric acid and atmospheric air to convert it into stannic chlorid, bringing said stannic chlorid into contact with further quantities of tin, and again converting it into stannic chlorid, and repeating the operation until the desired concentration is reached, substantially as described.

9. The herein-described method of making stannic chlorid, which consists in subjecting a solution containing stannous chlorid to the action of a gaseous mixture containing free chlorin and a diluent, the diluent being in sufficient proportion to prevent undue rise of temperature, substantially as described.

10. The herein-described method of making stannic chlorid, which consists in subjecting a solution containing stannous chlorid to the action of a gaseous mixture containing free chlorin, hydrochloric acid and a diluent, the diluent being in sufficient proportion to prevent undue rise of temperature, substantially as described.

11. The herein-described method of making stannic chlorid, which consists in subjecting a solution containing stannous chlorid to the action of a gaseous mixture containing free chlorin, hydrochloric acid and atmospheric air, substantially as described.

12. The method of making stannic chlorid, which consists in subjecting a solution containing stannous chlorid to the action of a fluid containing free chlorin, thereby producing a solution containing stannic chlorid, bringing said stannic-chlorid solution into contact with metallic tin to form stannous chlorid, and subjecting said stannous-chlorid solution to the action of a fluid containing free chlorin, substantially as described.

13. The method of making stannic chlorid, which consists in subjecting a solution containing stannous chlorid to the action of a fluid containing free chlorin, thereby producing a solution containing stannic chlorid, bringing said stannic-chlorid solution into contact with metallic tin to form stannous chlorid, subjecting said stannous-chlorid solution to the action of a fluid containing free chlorin, and repeating the operation until the desired concentration is reached, substantially as described.

14. The method of making stannic chlorid, which consists in subjecting a solution containing stannous chlorid to the action of a fluid containing free chlorin, thereby producing a solution containing stannic chlorid, bringing said stannic-chlorid solution into contact with metallic tin to form stannous chlorid, subjecting said stannous-chlorid solution to the action of a fluid containing free chlorin, and repeating the operation until the concentration exceeds 1.8 specific gravity, substantially as described.

15. The method of making stannic chlorid, which consists in subjecting a solution containing stannic chlorid to the action of metallic tin, thereby forming stannous chlorid, and subjecting said stannous-chlorid solution to the action of a fluid containing free chlorin to produce a solution containing an increased amount of stannic chlorid, substantially as described.

16. The herein-described method of producing solutions containing stannic chlorid, which consists in subjecting a solution capable of dissolving tin as chlorid to the successive action of metallic tin and a fluid containing free chlorin, substantially as described.

17. The herein-described method of producing solutions containing chlorid of tin, which consists in subjecting a solution containing a compound of chlorin to the alternate action of metallic tin and a fluid containing free chlorin, substantially as described.

In testimony whereof I affix my signature in presence of two witnesses.

CHARLES E. ACKER.

Witnesses:
J. H. SCHENNERHORN,
D. S. MACKAY.